US010626836B2

(12) United States Patent
Goh

(10) Patent No.: US 10,626,836 B2
(45) Date of Patent: Apr. 21, 2020

(54) CONTROL METHOD OF IDLE STOP AND GO SYSTEM

(71) Applicants: Hyundai Motor Company, Seoul (KR); Kia Motors Corporation, Seoul (KR)

(72) Inventor: Sang Bum Goh, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 65 days.

(21) Appl. No.: 16/013,078

(22) Filed: Jun. 20, 2018

(65) Prior Publication Data

US 2019/0135285 A1 May 9, 2019

(30) Foreign Application Priority Data

Nov. 7, 2017 (KR) .......................... 10-2017-0147520

(51) Int. Cl.
*F02N 11/08* (2006.01)
*B60W 30/18* (2012.01)
(Continued)

(52) U.S. Cl.
CPC .......... *F02N 11/0814* (2013.01); *B60T 7/042* (2013.01); *B60T 8/00* (2013.01); *B60T 8/17* (2013.01); *B60T 8/32* (2013.01); *B60T 13/146* (2013.01); *B60T 13/662* (2013.01); *B60T 13/686* (2013.01); *B60W 10/06* (2013.01); *B60W 10/188* (2013.01); *B60W 30/18018* (2013.01); *B60W 30/192* (2013.01);
(Continued)

(58) Field of Classification Search
CPC ............. F02N 11/0814; F02N 11/0818; F02N 2300/00; F02N 2300/20; B60W 30/18018; B60W 10/06; B60W 10/188; B60W 30/192; B60T 8/00; B60T 8/17; B60T 8/32; B60T 8/4872; B60T 13/146; B60T 13/662; B60T 13/686
USPC .......................... 701/112; 123/179.4, 179.3
See application file for complete search history.

(56) References Cited

U.S. PATENT DOCUMENTS 7,210,443 B2   5/2007  Shimokawa et al.
2013/0211685 A1*  8/2013  Ullrich ..................... B60T 1/10
                                                701/70
(Continued)

FOREIGN PATENT DOCUMENTS

JP     2014105658 A    6/2014
JP       6011360 B2   10/2016
(Continued)

*Primary Examiner* — Mahmoud Gimie
(74) *Attorney, Agent, or Firm* — Mintz Levin Cohn Ferris Glovsky and Popeo, P.C.; Peter F. Corless

(57) ABSTRACT

A control method of an idle stop and go system is provided. The method includes determining whether a stop condition of an engine operating in an idle state is satisfied and determining whether a pressure increase value of a brake oil formed during a predetermined time period is greater than a predetermined value when the stop condition of the engine is satisfied. A valve connected to a hydraulic line to which the brake oil pressure is transmitted is then temporarily closed and then reopened when the pressure increase value is greater than the predetermined value. The engine is stopped after the valve is temporarily closed and reopened.

16 Claims, 4 Drawing Sheets

(51) Int. Cl.
| | |
|---|---|
| *B60T 13/68* | (2006.01) |
| *B60W 10/06* | (2006.01) |
| *B60W 10/188* | (2012.01) |
| *B60W 30/192* | (2012.01) |
| *B60T 8/00* | (2006.01) |
| *B60T 7/04* | (2006.01) |
| *B60T 13/14* | (2006.01) |
| *B60T 8/17* | (2006.01) |
| *B60T 13/66* | (2006.01) |
| *B60T 8/32* | (2006.01) |
| *B60T 8/48* | (2006.01) |

(52) U.S. Cl.
CPC ......... *F02N 11/0818* (2013.01); *B60T 8/4872* (2013.01); *B60T 2220/04* (2013.01); *B60T 2250/04* (2013.01); *B60T 2270/30* (2013.01); *B60W 2510/0638* (2013.01); *B60W 2510/0676* (2013.01); *B60W 2510/1005* (2013.01); *B60W 2510/244* (2013.01); *B60W 2520/10* (2013.01); *B60W 2540/10* (2013.01); *B60W 2540/12* (2013.01); *B60W 2710/06* (2013.01); *B60W 2710/182* (2013.01)

(56) References Cited

U.S. PATENT DOCUMENTS

| | | | | |
|---|---|---|---|---|
| 2013/0238216 | A1* | 9/2013 | Yamamoto | B60T 7/042 |
| | | | | 701/101 |
| 2013/0297179 | A1* | 11/2013 | Gruber | B60T 13/68 |
| | | | | 701/102 |
| 2014/0288798 | A1* | 9/2014 | Ando | B60W 30/14 |
| | | | | 701/93 |
| 2015/0217741 | A1* | 8/2015 | Kikawa | B60L 7/18 |
| | | | | 701/71 |

FOREIGN PATENT DOCUMENTS

| | | |
|---|---|---|
| KR | 20070052613 A | 5/2007 |
| KR | 20090107359 A | 10/2009 |
| KR | 10-2018-0033717 | 4/2018 |

\* cited by examiner

CONTROL METHOD OF IDLE STOP AND GO SYSTEM

CROSS-REFERENCE TO RELATED APPLICATION

This application claims priority to and the benefit of Korean Patent Application No. 10-2017-0147520 filed on Nov. 7, 2017, the entire contents of which are incorporated herein by reference.

BACKGROUND

(a) Field of the Invention

The present invention relates to a control method of an idle stop and go system that reduces exhaust gas and fuel consumption by stopping an engine operation when a stop condition is satisfied while the engine is rotating in an idle state and that restarts the engine when a release condition is satisfied in a stop state of the engine.

(b) Description of the Related Art

Generally, an engine continues to be driven even when a vehicle is stopped, and thus fuel continues to be consumed which further increases pollution of air environment. Accordingly, an idle stop and go (ISG) system has been developed to reduce the fuel consumed by the vehicle and to protect the environment. When the vehicle is stopped and a particular condition is satisfied, the ISG system stops the engine without maintaining the engine in an idle state. When a driver of the vehicle engages a clutch pedal or releases a brake pedal, the ISG system automatically restarts the engine.

The ISG system has effect of improving fuel economy of the vehicle, reducing exhaust gas, and increasing consumption cycle of various consumable parts including the engine oil. The engine stop condition in the ISG system may be different based on a type of the vehicle or a manufacturer of the vehicle. For example, driving information including a gear shift stage of the vehicle, the vehicle speed, the engine speed, an operation of the brake pedal, a state of charge (SOC) of a battery, the battery voltage, and a coolant temperature may be detected, and the engine may enter into a stop mode of the engine based on the detected driving information.

A technology related to the ISG system has been developed. According to the related art, in an ISG system, travel information is detected and analyzed to determine whether an engine stop condition is satisfied. In response to determining that the engine stop condition is satisfied, a controller of the ISG system stops an operation of the engine.

The travel information is monitored in the engine stop mode to determine whether a first release condition based on a driver's intention is satisfied. The first release condition may be satisfied when an operation of a brake pedal is detected or an operation of an accelerator pedal is detected. When the first release condition is satisfied, the controller restarts the engine. When the first release condition is not satisfied, whether a second release condition is satisfied is determined.

In particular, the second release condition may be determined using a temperature of an oxidation catalyst device (DOC), a coolant temperature, the engine oil temperature, a state of charge (SOC) of a battery, and a brake oil pressure. When the second release condition is not satisfied, an idle stop mode is continuously maintained. When the second release condition is satisfied, the engine is restarted regardless of the driver's intention.

There may be a situation in which the engine is desired to be operated in a state where an operation button of the ISG system is turned on even when the engine stop condition is satisfied. Accordingly, the driver is required to turn the operation button off and then turn the operation button on. Therefore, research is being conducted to control an operation of the ISG system using a behavior of the brake pedal operated by the driver and to inform the driver of an operating state of the ISG system using the brake pedal.

The above information disclosed in this section is merely for enhancement of understanding of the background of the invention and therefore it may contain information that does not form the prior art that is already known in this country to a person of ordinary skill in the art.

SUMMARY

The present invention provides a control method of an idle stop and go system which is capable of improving driver convenience by allowing an engine to operate using a brake pedal even when a stop condition of the engine is satisfied in a state where the driver turns an idle stop switch on.

An exemplary embodiment of the present invention provides the control method of the idle stop and go system that may include: determining, by a controller, whether a stop condition of an engine operating in an idle state is satisfied; determining, by the controller, whether a pressure increase value of a brake oil generated during a predetermined time period is greater than a predetermined value when the stop condition of the engine is satisfied; temporarily closing, by the controller, a valve connected to a hydraulic line to which the brake oil pressure is transmitted and reopening the valve when the pressure increase value is greater than the predetermined value; and stopping, by the controller, the engine after the valve is temporarily closed and reopened.

The valve may be a normal open valve disposed on the hydraulic line that transmits the brake oil pressure formed by a brake pedal to a brake. The valve may be a total cut valve disposed on the hydraulic line that transmits the brake oil pressure formed by a brake pedal to a brake. The stop condition of the engine may be determined by at least one factor selected from the group consisting of a speed of a vehicle, a battery voltage, an elapsed time after start of the engine, a rotation speed of the engine, an operation state of an accelerator pedal, the engine oil temperature, a gear shift stage of a transmission, and an operation state of a brake pedal. The control method may further include: determining, by the controller, whether a restart condition of the engine is satisfied. The controller may be configured to restart the engine when the restart condition is satisfied.

Another exemplary embodiment of the present invention provides the control method of the idle stop and go system that may include: determining, by a controller, whether a stop condition of an engine operating in an idle state is satisfied; determining, by the controller, whether a pressure increase value of a brake oil generated during a predetermined time period is greater than a predetermined value when the stop condition of the engine is satisfied; temporarily varying, by the controller, a pressure of the brake oil when the pressure increase value is greater than the predetermined value; and stopping, by the controller, the engine after the pressure of the brake oil is temporarily varied.

The controller may be configured to temporarily close a valve connected to a hydraulic line to which the brake oil pressure is transmitted and reopen the valve to temporarily vary the pressure of the brake oil. The pressure increase value may be sensed by a pressure sensor disposed on the hydraulic line. The stop condition of the engine may be determined by at least one factor selected from the group consisting of a speed of a vehicle, a battery voltage, an elapsed time after start of the engine, a rotation speed of the engine, an operation state of an accelerator pedal, the engine oil temperature, a gear shift stage of a transmission, and an operation state of a brake pedal.

The control method may further include: determining, by the controller, whether a restart condition of the engine is satisfied. The controller may be configured to restart the engine when the restart condition is satisfied. The stop condition of the engine may be satisfied when a speed of a vehicle is zero, a battery voltage is equal to or greater than a predetermined value, an elapsed time after start of the engine is equal to or greater than a predetermined value, a rotation speed of the engine is included in an idle region, the engine oil temperature is equal to or greater than a predetermined value, an accelerator pedal is disengaged, or a brake pedal is operated. The restart condition of the engine may be satisfied when the engine oil temperature is less than a predetermined value, a battery voltage is less than a predetermined value, a coolant temperature is less than a predetermined value, a front end temperature of an exhaust gas catalyst is less than a predetermined value, the accelerator pedal is operated, or the brake pedal is disengaged.

According to the exemplary embodiment of the present invention, operation depth of the brake pedal may be adjusted by the driver to stop or start the engine under an idle stop condition. For example, when the driver maximally engages the brake pedal, the engine may be stopped under the idle stop condition. When the driver engages the brake pedal minimally, the idle state may be maintained without stopping the engine even under the idle stop condition.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
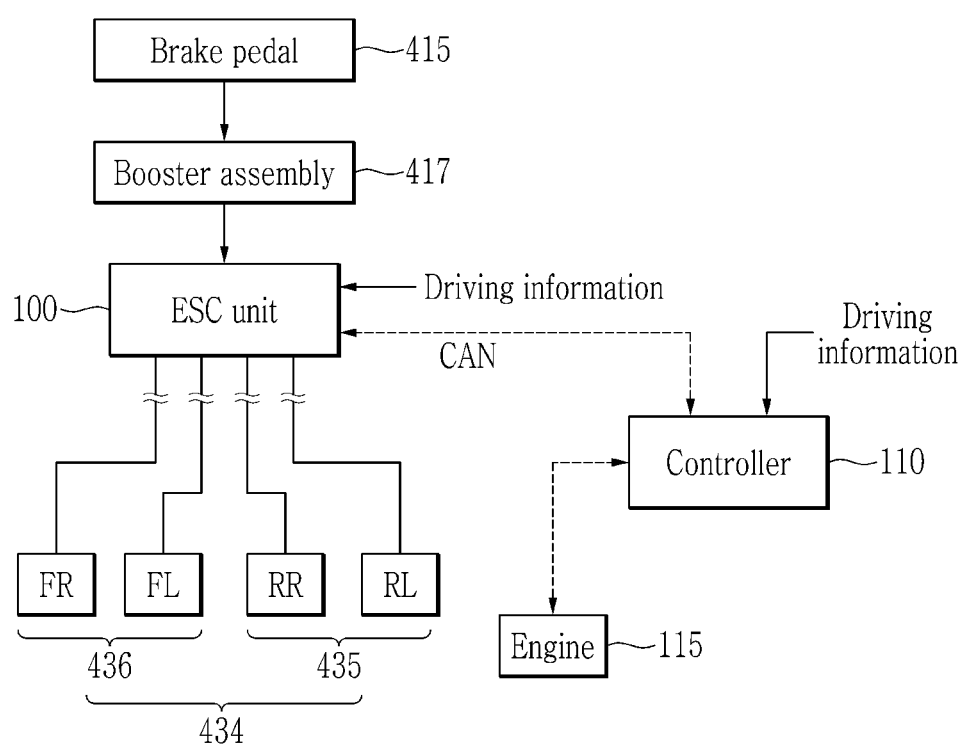
FIG. 1 is a configuration diagram of an idle stop and go system according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

An exemplary embodiment of the present invention will hereinafter be described in detail with reference to the accompanying drawings. The sizes and thicknesses of the configurations shown in the drawings are provided selectively for the convenience of description, such that the present invention is not limited to those shown in the drawings and the thicknesses are exaggerated to make some parts and regions clear.

However, parts which are not related with the description are omitted for clearly describing the exemplary embodiment of the present invention, and like reference numerals refer to like or similar elements throughout the specification. In the following description, dividing names of components into first, second, and the like is to divide the names because the names of the components are the same as each other, and an order thereof is not particularly limited.

FIG. 1 is a configuration diagram of an idle stop and go system according to an exemplary embodiment of the present invention. Referring to FIG. 1, the idle stop and go system may include a brake pedal 415, a booster assembly 417, an electronic stability controller (ESC) unit 100, a controller (or a control unit) 110, an engine 115, and a brake 434.

In particular, the brake 434 may include a front wheel brake 436 and a rear wheel brake 435 and may be a component operated by a driver of a vehicle. The booster assembly 417 may increase pressure of the brake oil (or the brake fluid) based on an operation of the brake pedal 415. The ESC unit 100 may use a valve to adjust a hydraulic pressure generated by the booster assembly 417 to be converted to an oil pressure distributed to the front wheel brake 436 and the rear wheel brake 435. The ESC unit 100 may be configured to receive driving information including the vehicle speed, a voltage of a battery of the vehicle, an elapsed time after start of the engine, a rotation speed (e.g., a revolution per minute (RPM)) of the engine, the engine oil temperature, an operation state of an accelerator pedal, an operation state of the brake pedal 415, a gear shift stage of a transmission, a coolant temperature, or a front end temperature (e.g., an inlet temperature) of a catalyst (e.g., an exhaust gas catalyst), and may be connected to the controller 110 via controller area network (CAN) communication. The battery may be used to start the vehicle.

The controller 110 may be configured to operate the ESC unit 100 based on the driving information to execute start and stop of the engine 115. The engine 115 may be started by a start motor and may be stopped by blocking a fuel injection of an injector. The brake hydraulic pressure generated by the booster assembly 417 may increase proportional to a degree to which the driver engages the brake pedal 415. The controller 110 may be configured to determine whether a stop condition of the engine 115 operating in an idle state is satisfied. When the stop condition of the engine 115 is satisfied, the controller 110 may be configured to determine whether a pressure increase value ΔP is greater than a predetermined value (e.g., about 3 bars).

Figure 2:
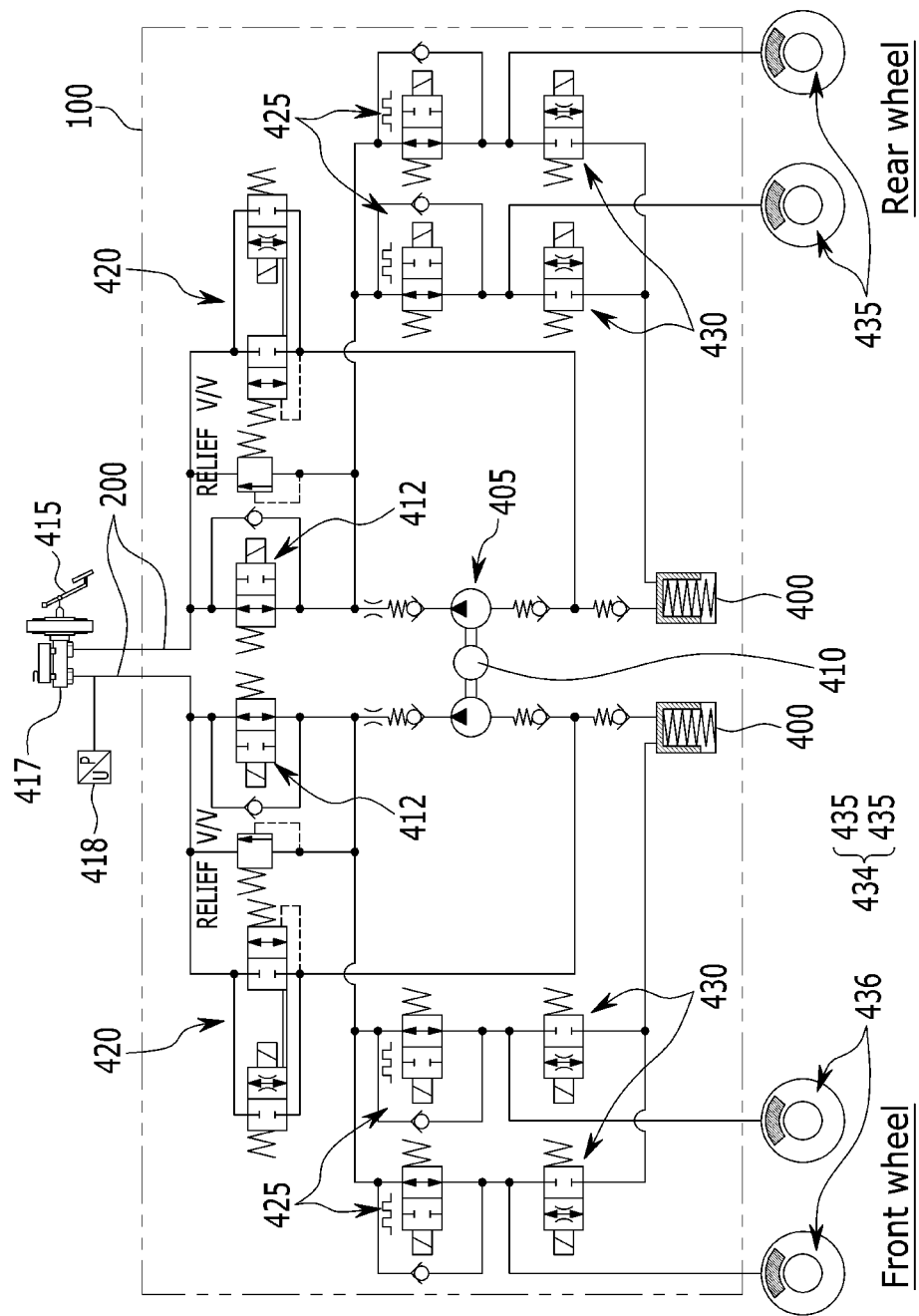
FIG. 2 is a hydraulic circuit diagram of an ESC unit in the idle stop and go system according to an exemplary embodiment of the present invention.

When the pressure increase value ΔP is greater than the predetermined value, the controller 110 may be configured to temporarily close a valve disposed on a hydraulic line 200 in FIG. 2 which transmits a pressure of the brake oil to the brake, and then may reopen the valve. The engine may be stopped after the valve is temporarily closed and opened again. The valve may be a NO valve (e.g., a normal open valve) 425 or a TC valve (e.g., a total cut valve or a traction control valve) 412 of FIG. 2. For example, the controller 110 may be one or more microprocessors operated by a program or hardware including the microprocessor. The program may include a series of commands for executing the method according to the exemplary embodiment of the present invention, which will be described below. The commands may be stored in a memory.

The parts not described in the exemplary embodiments of the present invention may be already known technologies and products. The exemplary embodiment of the present invention may optionally include already known techniques. FIG. 2 is a hydraulic circuit diagram of the ESC unit in the idle stop and go system according to an exemplary embodiment of the present invention. Referring to FIG. 2, the ESC unit 100 may be a main element and may include the brake pedal 415, the booster assembly 417, a pressure sensor 418, the TC valve 412, an ES valve (e.g., an electronic shuttle valve) 420, the NO valve 425, an NC valve (e.g., a normally closed valve) 430, the rear wheel brake 435, the front wheel brake 436, a hydraulic pressure storage unit 400, a pump 405, and a motor 410.

When the brake pedal 415 is engaged or operated, the ES valve 420 may be opened and the brake oil pressurized by the booster assembly 417 may be moved to a suction side of the pump 405 through the ES valve 420. The pump 405 may be operated by the motor 410 to pump the oil. The NC valve 430 may be closed and the NO valve 425 may be opened to cause the pumped oil to apply braking force to the rear wheel brake 435 and the front wheel brake 436. A pressure of the brake oil may be instantaneously decreased or increased based on a momentary on/off operation of the NC valve 430, the TC valve 412, or the NO valve 425.

Additionally, the pressure sensor 418 may be configured to sense a hydraulic pressure formed in the hydraulic line 200 by the oil discharged from the booster assembly 417 and may be configured to transmit the sensed signal to the controller 110. In another exemplary embodiment of the present invention, the ESC unit 100 is not limited to the hydraulic circuit of the brake oil described in FIG. 2, and the ESC unit 100 may optionally include a known hydraulic circuit.

Figure 3:
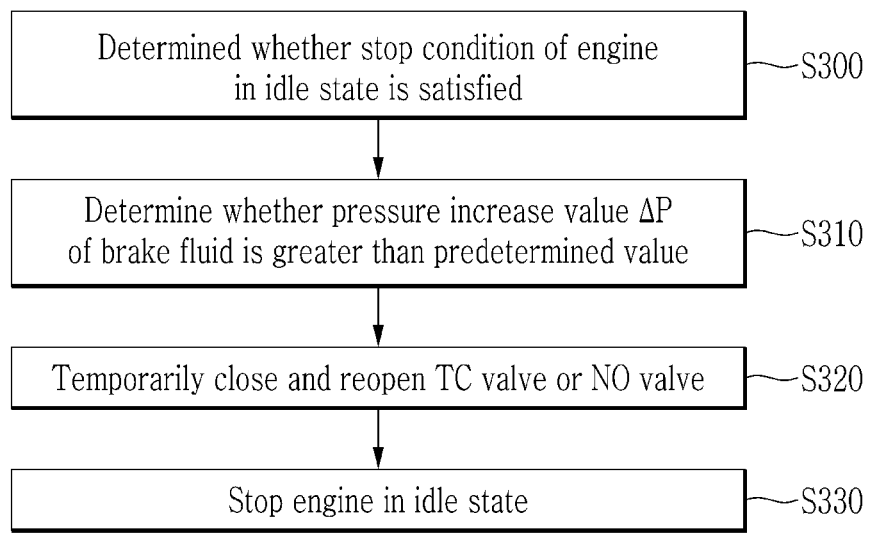
FIG. 3 is an overall flowchart showing a control method of the idle stop and go system according to an exemplary embodiment of the present invention.

FIG. 3 is an overall flowchart showing a control method of the idle stop and go system according to an exemplary embodiment of the present invention. Referring to FIG. 3, in a step S300, the controller 110 may be configured to determine whether a stop condition of the engine 115 operating in an idle state is satisfied. In a step S310, the controller 110 may be configured to determine whether a pressure increase value ΔP of the brake oil generated according to an operation of the brake pedal 415 is greater than a predetermined value. The pressure increase value ΔP may be sensed by the pressure sensor 418.

In a step S320, the controller 110 may be configured to temporarily close the TC valve 412 or the NO valve 425 and then open the TC valve 412 or the NO valve 425 again. In a step S330, the controller 110 may be configured to stop the engine 115 operating in the idle state. The controller 110 may be configured to block the fuel injection through the fuel injection injector. It is obvious to those skilled in the art how the fuel injection of the injector is blocked, and thus the explanation thereof is omitted.

Figure 4:
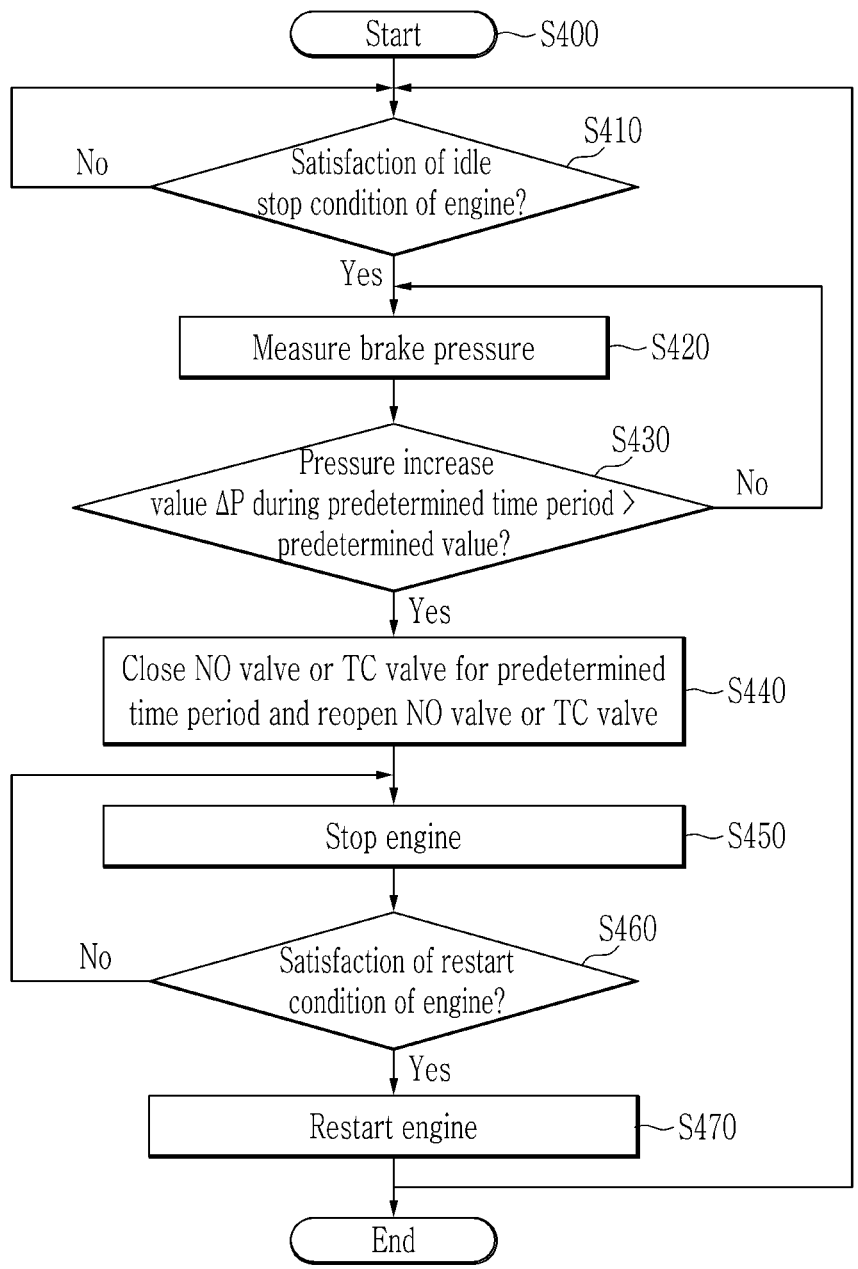
FIG. 4 is a detailed flowchart illustrating a control method of the idle stop and go system according to an exemplary embodiment of the present invention.

FIG. 4 is a detailed flowchart illustrating a control method of the idle stop and go system according to an exemplary embodiment of the present invention. Referring to FIG. 4, in a step S400, the engine 115 may be operated and the control may be started. In a step S410, the controller 110 may be configured to determine whether an idle stop condition of the engine 115 operating in the idle state is satisfied based on the driving information.

In a step S420, the controller 110 may be configured to measure a brake hydraulic pressure discharged from the booster assembly 417 and formed in the hydraulic line 200 when the idle stop condition of the engine is satisfied. In a step S430, the controller 110 may be configured to calculate the pressure increase value ΔP formed during a predetermined time period (e.g., about 0.5 seconds) and determine whether the pressure increase value ΔP is greater than the predetermined value. When the pressure increase value ΔP is equal to or less than the predetermined value, the step S420 may be repeated. When the pressure increase value ΔP is greater than the predetermined value, a step S440 may be performed.

In the step S440, the controller 110 may be configured to temporarily close the NO valve 420 or the TC valve 412 for a predetermined time period and open the valve again to temporarily vary a pressure of the brake oil. In a step S450, the controller 110 may be configured to interrupt a fuel injected from the injector to stop an operation of the engine 115 which is being operated in the idle state. In a step S460, the controller 110 may be configured to determine whether a restart condition is satisfied. When the restart condition is not satisfied, the step S450 may be repeated. When the restart condition is satisfied, the controller 110 may be configured to restart the engine 115 in a step S460.

In an exemplary embodiment of the present invention, the driver may receive a physical feeling (e.g., a rattling signal) input from the brake pedal 415 using an operation of the step S440. The physical feeling and the idle stop condition may cause the engine to be stopped. The driver may adjust an engagement depth of the brake pedal 415 to stop the engine 115 or maintain the engine 115 in an idle state when the idle stop condition is satisfied. For example, when the driver maximally engages the brake pedal 415, the engine 115 may be stopped under the idle stop condition. When the driver minimally engages the brake pedal 415, the idle state may be maintained without stopping the engine even under the idle stop condition.

In the exemplary embodiment of the present invention, it is obvious to those skilled in the art that a brake hydraulic pressure generated by the booster assembly 417 increases when the operating depth of the brake pedal 415 is maximal, and thus the explanation thereof is omitted. In an exemplary embodiment of the present invention, the idle stop condition of the engine 115 may be satisfied when a speed of the vehicle is zero, the battery voltage is equal to or greater than a predetermined value (e.g., about 11V), the elapsed time after start of the engine is equal to or greater than a predetermined value, the rotation speed of the engine is included in an idle region, the engine oil temperature is equal to or greater than a predetermined value, the accelerator pedal is not operated or disengaged, and/or the brake pedal 415 is operated.

The restart condition of the engine 115 may be satisfied when the engine oil temperature is less than the predetermined value, the battery voltage is less than the predetermined value, the coolant temperature is less than a predetermined value, the front end temperature of the exhaust gas catalyst is less than a predetermined value, the accelerator pedal is operated, or the brake pedal 415 is not operated.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

DESCRIPTION OF SYMBOLS

415: brake pedal
417: booster assembly
100: ESC unit
436: front wheel brake
435: rear wheel brake
115: engine
110: controller
418: pressure sensor
425: NO valve
412: TC valve

What is claimed is:

1. A control method of an idle stop and go system, comprising:
   determining, by a controller, whether a stop condition of an engine operating in an idle state is satisfied;
   determining, by the controller, whether a pressure increase value of a brake oil generated during a predetermined time period is greater than a predetermined value when the stop condition of the engine is satisfied;
   temporarily closing, by the controller, a valve connected to a hydraulic line to which the brake oil pressure is transmitted and reopening the valve when the pressure increase value is greater than the predetermined value; and
   stopping, by the controller, the engine after the valve is temporarily closed and reopened.

2. The method of claim 1, wherein the valve is a normal open valve disposed on the hydraulic line that transmits the brake oil pressure generated by a brake pedal to a brake.

3. The method of claim 1, wherein the valve is a total cut valve disposed on the hydraulic line that transmits the brake oil pressure generated by a brake pedal to a brake.

4. The method of claim 1, wherein the stop condition of the engine is determined by at least one factor selected from the group consisting of: a speed of a vehicle, a battery voltage, an elapsed time after start of the engine, a rotation speed of the engine, an operation state of an accelerator pedal, the engine oil temperature, a gear shift stage of a transmission, and an operation state of a brake pedal.

5. The method of claim 1, further comprising:
   determining, by the controller, whether a restart condition of the engine is satisfied.

6. The method of claim 5, wherein the controller is configured to restart the engine when the restart condition is satisfied.

7. A control method of an idle stop and go system, comprising:
   determining, by a controller, whether a stop condition of an engine operating in an idle state is satisfied;
   determining, by the controller, whether a pressure increase value of a brake oil generated during a predetermined time period is greater than a predetermined value when the stop condition of the engine is satisfied;
   temporarily varying, by the controller, a pressure of the brake oil when the pressure increase value is greater than the predetermined value; and
   stopping, by the controller, the engine after the pressure of the brake oil is temporarily varied.

8. The method of claim 7, further comprising:
   temporarily closing, by the controller, a valve connected to a hydraulic line to which the brake oil pressure is transmitted and reopening the valve to temporarily vary the pressure of the brake oil.

9. The method of claim 8, wherein the pressure increase value is detected by a pressure sensor disposed on the hydraulic line.

10. The method of claim 7, wherein the stop condition of the engine is determined by at least one factor selected from the group consisting of: a speed of a vehicle, a battery voltage, an elapsed time after start of the engine, a rotation speed of the engine, an operation state of an accelerator pedal, the engine oil temperature, a gear shift stage of a transmission, and an operation state of a brake pedal.

11. The method of claim 7, further comprising:
   determining, by the controller, whether a restart condition of the engine is satisfied.

12. The method of claim 11, wherein the controller is configured to restart the engine when the restart condition is satisfied.

13. The method of claim 7, wherein the stop condition of the engine is satisfied when a speed of a vehicle is zero, a battery voltage is equal to or greater than a predetermined value, an elapsed time after start of the engine is equal to or greater than a predetermined value, a rotation speed of the engine is included in an idle region, the engine oil temperature is equal to or greater than a predetermined value, an accelerator pedal is not operated, or a brake pedal is operated.

14. The method of claim 12, wherein the restart condition of the engine is satisfied when the engine oil temperature is less than a predetermined value, a battery voltage is less than a predetermined value, a coolant temperature is less than a predetermined value, a front end temperature of an exhaust gas catalyst is less than a predetermined value, the accelerator pedal is operated, or the brake pedal is not operated.

15. An idle stop and go system, comprising:
a brake pedal;
a booster assembly configured to increase pressure of brake fluid based on an operation of the brake pedal;
an electronic stability controller (ESC) unit configured to operate a valve to adjust a hydraulic pressure generated by the booster assembly to be converted to an oil pressure distributed to a brake; and
a controller configured to operate the ESC unit based on driving information collected by the ESC unit to execute start and stop of an engine,
wherein the driving information collected by the ESC unit includes a vehicle speed, a voltage of a battery of the vehicle, an elapsed time after start of the engine, a rotation speed of the engine, an engine oil temperature, an operation state of an accelerator pedal, an operation state of the brake pedal, a gear shift stage of a transmission, and a coolant temperature, and
wherein the controller is configured to:
determine whether a stop condition of an engine operating in an idle state is satisfied;
determine whether a pressure increase value of the brake fluid generated during a predetermined time period is greater than a predetermined value when the stop condition of the engine is satisfied;
temporarily close the valve connected to a hydraulic line to which the brake fluid pressure is transmitted and reopen the valve when the pressure increase value is greater than the predetermined value; and
stop the engine after the valve is temporarily closed and reopened.

16. The system of claim 15, wherein the stop condition of the engine is determined by at least one of the driving information collected by the ESC unit.

* * * * *